(12) United States Patent
Li et al.

(10) Patent No.: US 8,743,749 B2
(45) Date of Patent: Jun. 3, 2014

(54) METHOD AND APPARATUS FOR MANAGING FLEXIBLE USAGE OF UNPAIRED FREQUENCIES

(75) Inventors: Yan Li, Beijing (CN); Lu Gao, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 268 days.

(21) Appl. No.: 12/843,467

(22) Filed: Jul. 26, 2010

(65) Prior Publication Data

US 2011/0019596 A1 Jan. 27, 2011

Related U.S. Application Data

(60) Provisional application No. 61/228,734, filed on Jul. 27, 2009.

(51) Int. Cl.
*H04J 1/00* (2006.01)

(52) U.S. Cl.
USPC ............ 370/281; 370/329; 370/437; 370/465

(58) Field of Classification Search
USPC .................................................. 370/281, 329
See application file for complete search history.

(56) References Cited

U.S. PATENT DOCUMENTS

| | | | | |
|---|---|---|---|---|
| 7,453,912 | B2 * | 11/2008 | Laroia et al. | 370/526 |
| 7,817,592 | B2 * | 10/2010 | Yun et al. | 370/328 |
| 2006/0274685 | A1 * | 12/2006 | Johnson et al. | 370/328 |
| 2008/0279125 | A1 * | 11/2008 | Hottinen | 370/281 |
| 2009/0011770 | A1 | 1/2009 | Jung et al. | |
| 2010/0214972 | A1 * | 8/2010 | Che et al. | 370/315 |
| 2011/0081871 | A1 * | 4/2011 | Molnar | 455/67.13 |
| 2012/0134275 | A1 * | 5/2012 | Choi et al. | 370/241 |

FOREIGN PATENT DOCUMENTS

| | | |
|---|---|---|
| CN | 1655630 A | 8/2005 |
| CN | 1943141 A | 4/2007 |
| EP | 1343338 | 9/2003 |
| JP | 2009017560 A | 1/2009 |
| KR | 20090003946 A | 1/2009 |
| WO | WO2006130318 | 12/2006 |

OTHER PUBLICATIONS

International Search Report and Written Opinion—PCT/US2010/043327, International Search Authority—European Patent Office-Nov. 22, 2010.
Taiwan Search Report—TW099124754—TIPO—May 9, 2013.

* cited by examiner

*Primary Examiner* — Yemane Mesfin
*Assistant Examiner* — Henry Baron
(74) *Attorney, Agent, or Firm* — Charles Chesney

(57) ABSTRACT

A method, an apparatus, and a computer program product for wireless communication are provided in which it is determined, by a first device, if a transmission using a second frequency band to a second device will result in a parameter exceeding a threshold value, and content is either transmitted using a first frequency band upon a determination that the transmission to the second device will result in the parameter exceeding the threshold, or transmitted using the first frequency band and a second frequency band upon a determination that the transmission to the second device will result in the parameter not exceeding the threshold, wherein the first and second frequency bands are different.

36 Claims, 7 Drawing Sheets

METHOD AND APPARATUS FOR MANAGING FLEXIBLE USAGE OF UNPAIRED FREQUENCIES

CROSS-REFERENCE TO RELATED APPLICATION(S)

This application claims the benefit of U.S. Provisional Application Ser. No. 61/228,734, entitled "FLEXIBLE USAGE OF UNPAIRED FREQUENCY IN FDD NETWORK," filed on Jul. 27, 2009, which is expressly incorporated by reference herein in its entirety.

BACKGROUND

1. Field

The present disclosure relates generally to communication systems, and more particularly, to management of usage for unpaired frequencies in a frequency division duplex (FDD) system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the DL, SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with management of usage for unpaired frequencies in a FDD system. The method can comprise determining, by a first device, if a transmission using a second frequency band to a second device will result in a parameter exceeding a threshold value, and transmitting content using a first frequency band upon a determination that the transmission to the second device will result in the parameter exceeding the threshold, or transmitting content using the first frequency band and a second frequency band upon a determination that the transmission to the second device will result in the parameter not exceeding the threshold, wherein the first and second frequency bands are different.

Yet another aspect relates to an apparatus. The apparatus can include means for determining, by a first device, if a transmission using a second frequency band to a second device will result in a parameter exceeding a threshold value, and means for transmitting content using a first frequency band upon a determination that the transmission to the second device will result in the parameter exceeding the threshold, or means for transmitting content using the first frequency band and a second frequency band upon a determination that the transmission to the second device will result in the parameter not exceeding the threshold, wherein the first and second frequency bands are different.

Still another aspect relates to a computer program product comprising a computer-readable medium. The computer-readable medium can include code for determining, by a first device, if a transmission using a second frequency band to a second device will result in a parameter exceeding a threshold value, and transmitting content using a first frequency band upon a determination that the transmission to the second device will result in the parameter exceeding the threshold, or transmitting content using the first frequency band and a second frequency band upon a determination that the transmission to the second device will result in the parameter not exceeding the threshold, wherein the first and second frequency bands are different.

Another aspect relates to an apparatus for wireless communications. The apparatus can include processing system configured to determine, by a first device, if a transmission using a second frequency band to a second device will result in a parameter exceeding a threshold value, and transmit content using a first frequency band upon a determination that the transmission to the second device will result in the parameter exceeding the threshold, or transmit content using the first frequency band and a second frequency band upon a determination that the transmission to the second device will result in the parameter not exceeding the threshold, wherein the first and second frequency bands are different.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
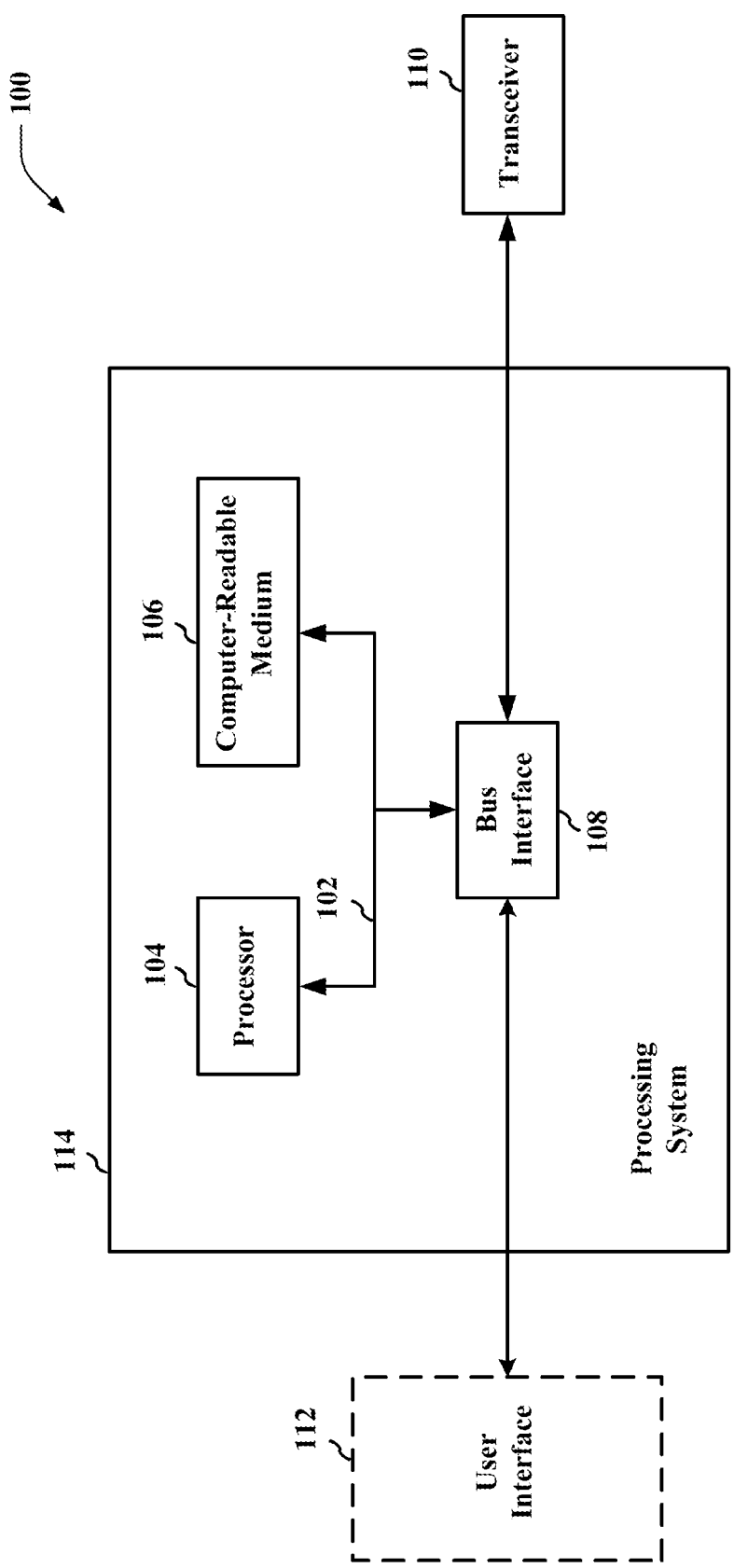
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by processor 104, and computer-readable media, represented generally by computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
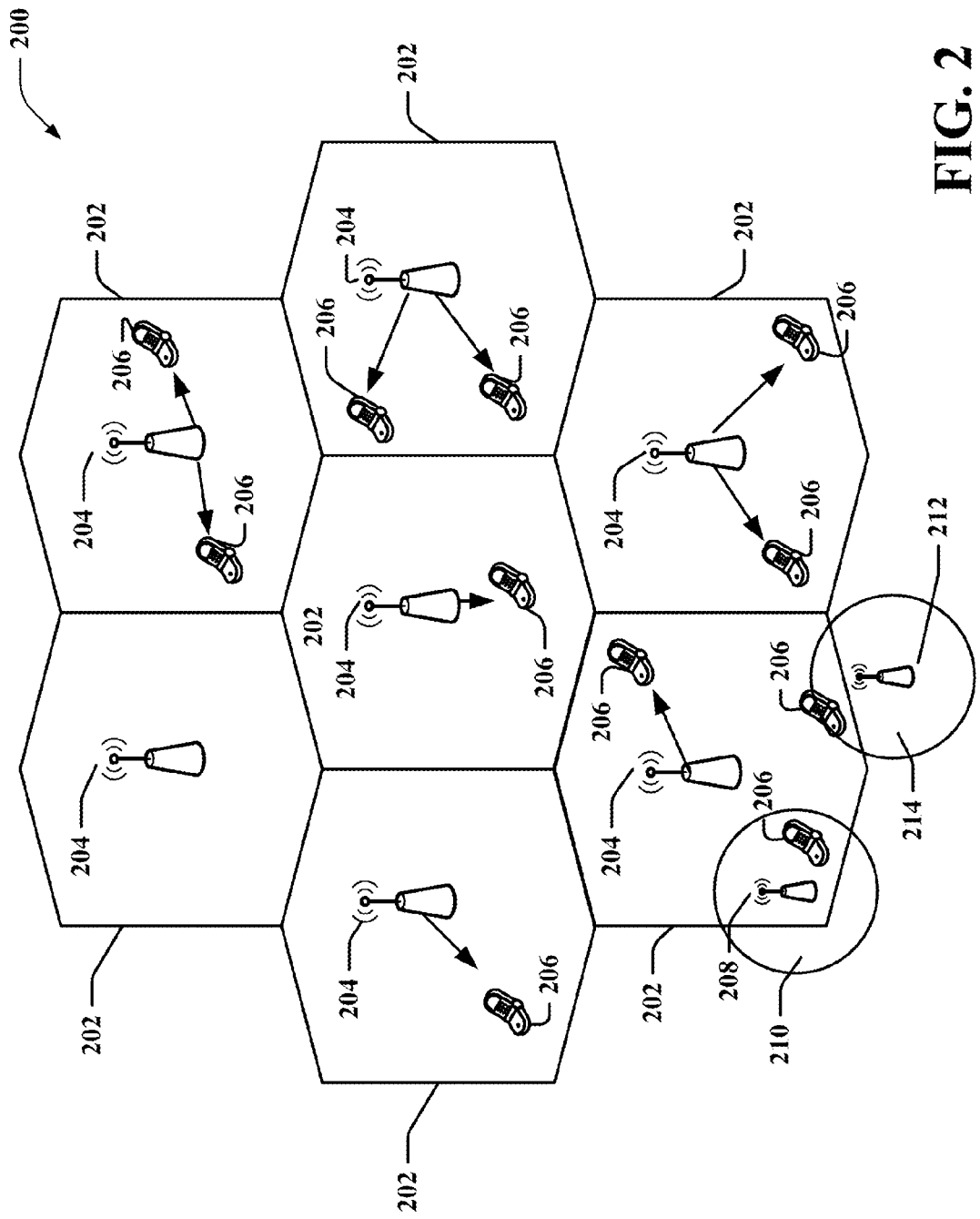
FIG. 2 is a diagram illustrating an example of an access network.

FIG. 2 is a diagram illustrating an example of an access network in an LTE network architecture employing various apparatuses 100 (see FIG. 1). In this example, a heterogeneous access network 200 is depicted. In such an aspect, the network 200 is divided into a number of cellular regions (cells) 202. One or more lower power class eNodeBs 208, 212 may have cellular regions 210, 214, respectively, that overlap with one or more of the cells 202. The lower power class eNodeBs 208, 212 may be femto cells (e.g., home eNodeBs (HeNBs)), pico cells, or micro cells. A higher power class or macro eNodeB 204 is assigned to a cell 202 and is configured to provide an access point to a network for all the UEs 206 in the cell 202. Further, different power classes may have different settings. For example, a macro eNodeB power class may have different settings, than a femto eNodeB power class, which may be different settings than a pico eNodeB power class. There is no centralized controller in this example of an access network 200, but a centralized controller may be used in alternative configurations. The eNodeB 204 is responsible for all radio related functions including radio bearer control, admission control, mobility control, scheduling, security, and connectivity to a serving gateway.

In one exemplary aspect, a heterogeneous network may refer to a network where, besides conventional cellular base stations (macro cells), other types of cells with lower power classes, such as pico cells or relay cells are present.

The modulation and multiple access scheme employed by the access network 200 may vary depending on the particular telecommunications standard being deployed. In LTE applications, OFDM is used on the DL and SC-FDMA is used on the UL to support both FDD and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), UMB, IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
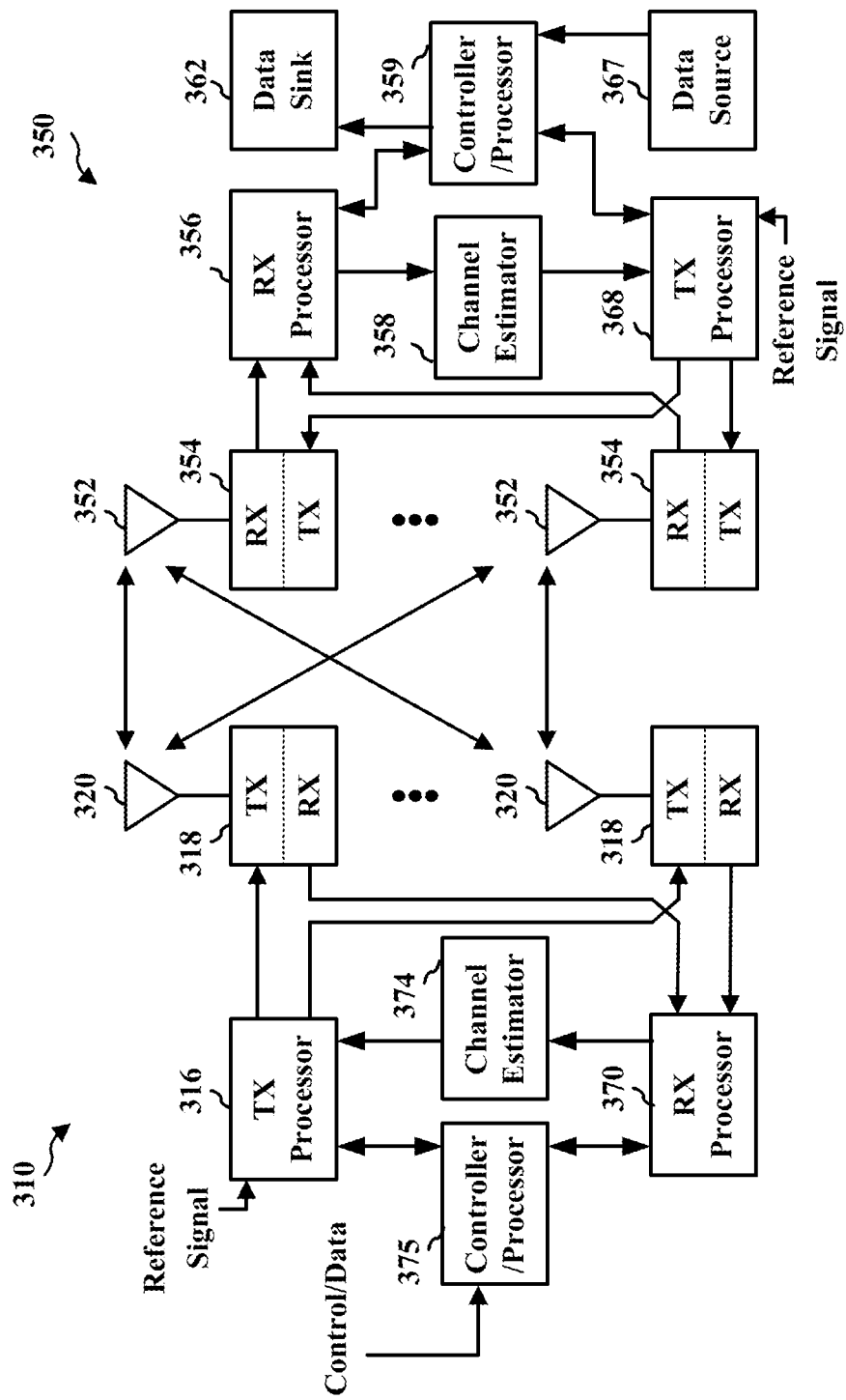
FIG. 3 is a diagram illustrating an example of an evolved Node B and user equipment in an access network.

FIG. 3 is a block diagram of an eNodeB 310 in communication with a UE 350 in an access network. In the DL, upper layer packets from the core network are provided to a controller/processor 375. The controller/processor 375 implements the functionality of the L2 layer of a received packet. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The TX processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receiver (RX) processor 356.

The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 310. These soft decisions may be based on channel estimates computed by the channel estimator 358. The soft decisions are then decoded and deinterleaved to recover the data and control signals that were originally transmitted by the eNodeB 310 on the physical channel. The data and control signals are then provided to the controller/processor 359.

The controller/processor 359 implements the L2 layer of the packet. In the UL, the control/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer (L2). Similar to the functionality described in connection with the DL transmission by the eNodeB 310, the controller/processor 359 implements the L2 layer for the user plane and the control plane by providing header compression, ciphering, packet segmentation and reordering, and multiplexing between logical and transport channels based on radio resource allocations by the eNodeB 310. The controller/processor 359 is also responsible for HARQ operations, retransmission of lost packets, and signaling to the eNodeB 310.

Channel estimates derived by a channel estimator 358 from a reference signal or feedback transmitted by the eNodeB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNodeB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 implements the L1 layer.

The controller/processor 359 implements the L2 layer of a packet. In the UL, the control/processor 359 provides demultiplexing between transport and logical channels, packet reassembly, deciphering, header decompression, control signal processing to recover upper layer packets from the UE 350. Upper layer packets from the controller/processor 375 may be provided to the core network. The controller/processor 359 is also responsible for error detection using an ACK/NACK protocol to support HARQ operations.

In one aspect, the processing system 114 described in relations to FIG. 1 includes the eNodeB 310. In particular, the processing system 114 includes the TX processor 316, the RX processor 370, and the controller/processor 375. In another aspect, the processing system 114 described in relations to FIG. 1 includes the UE 350. In particular, the processing system 114 includes the TX processor 368, the RX processor 356, and the controller/processor 359.

Figure 4:
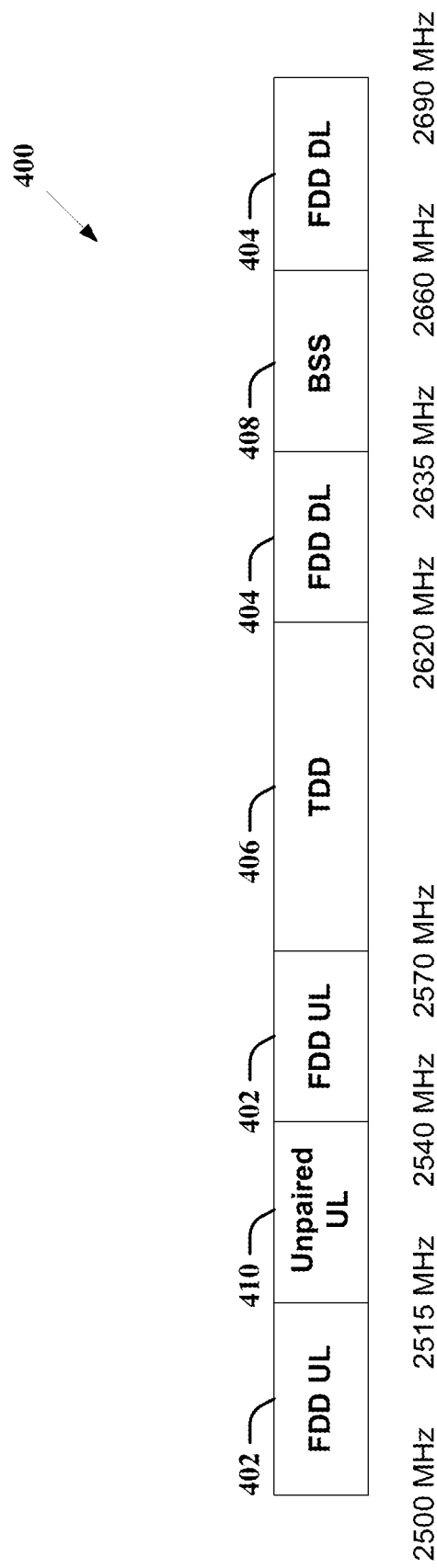
FIG. 4 is a diagram illustrating an example frequency band plan for use in an access network.

FIG. 4 is a block diagram illustrating an example frequency band plan for use in a network 400, according to an aspect. As depicted in FIG. 4, the frequency band plan may include frequency allocations for various activities. In one aspect, frequency bands may be allocated for FDD UL 402, FDD DL 404, and TDD 406. In one aspect, a frequency band may be allocated for a broadcast satellite service (BSS) 408, and as such may leave an unpaired frequency band (unpaired UL) 410.

In one example, a main stream band plan, such as one proposed by CEPT/ECC 05(05), is that 2500 MHz to 2570 MMHz may be allocated FDD uplink, 2620 MHz to 2690 MHz may be allocated to FDD downlink, and 2570 to 2620 MHz is allocated to a TDD system. Further, a BSS may be allocated 2635 MHz to 2660 MHz. As such, some part of the FDD uplink band plan may be allocated as an unpaired frequency and may be called a flexible uplink (Flex UL) band.

In one aspect, the unpaired band 410 may be used to enhance peer to peer communications between UEs. In another aspect, the unpaired band 410 may be used to enhance relay cell communications with an eNodeB. Further, in one aspect, use of the unpaired band 410 may provide compatibility with other main stream band plans, such as the CEPT/ECC 05(05) band plan. In another aspect, utilization of the unpaired band 410 may increase frequency usage efficiency. One may note that although a 2.5 GHz band plan is shown as an example, the solutions can be applicable for any unpaired frequency in FDD networks. Especially, it can increase the frequency usage efficiency when unpaired frequency is embedded in FDD UL band.

Generally, the unpaired frequency band 410 has been allocated to a TDD system. In such a case, if the unpaired frequency band of (e.g., 2515 MHz-2540 MHz) is allocated to a TDD system while the remained of the frequencies are allocated to a FDD system such as a main stream CEPT/ECC 05(05) band plan, then sufficient guard bands may be used around the unpaired frequency band 410 to avoid the excessive interference from a TDD downlink 406 and a FDD uplink 402. Further more, a receiver filter design may be necessary for a FDD eNodeB and a transmitter filter design may be necessary for TDD eNodeB in order to avoid interference from a TDD downlink 406 and FDD uplink 402. Further, some UEs using the unpaired frequencies for TDD may be subject to an interference risk from a roaming UE using the unpaired frequency for FDD. In such a case, design for a roaming UE using the unpaired frequency for FDD may not be compatible with designs for various main stream band plans (e.g., the CEPT/ECC 05(05) band plan). By contrast, use of the unpaired frequency band for FDD communications may eliminate any need for a guard band around the 2515 MHz and 2540 MHz and as such may allow for increased frequency usage efficiency.

Figure 5A:
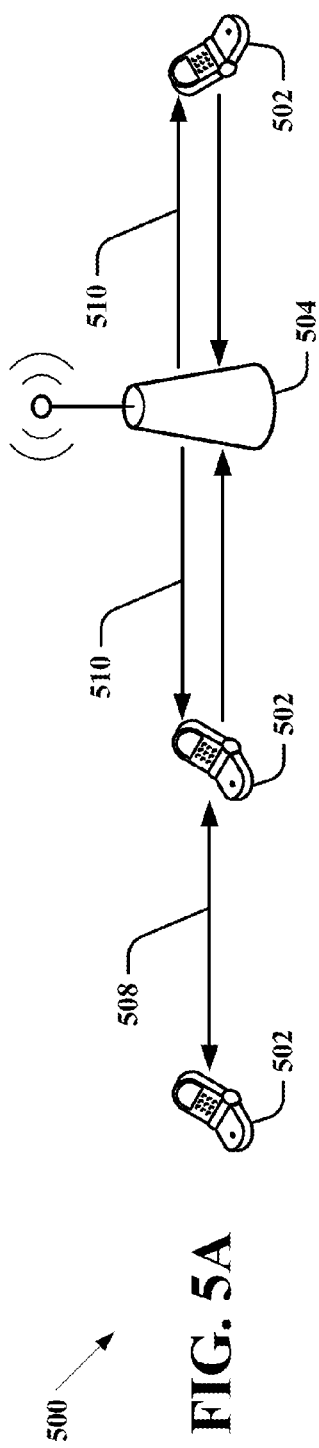
FIG. 5A is an example access network configuration using unpaired frequencies according to an aspect.
Figure 5B:
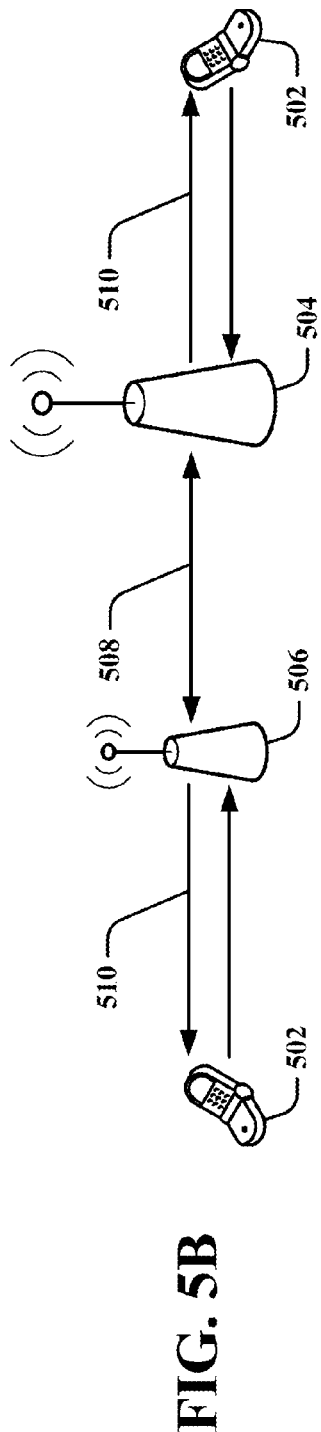
FIG. 5B is another example access network configuration using unpaired frequencies according to an aspect.
Figure 5C:
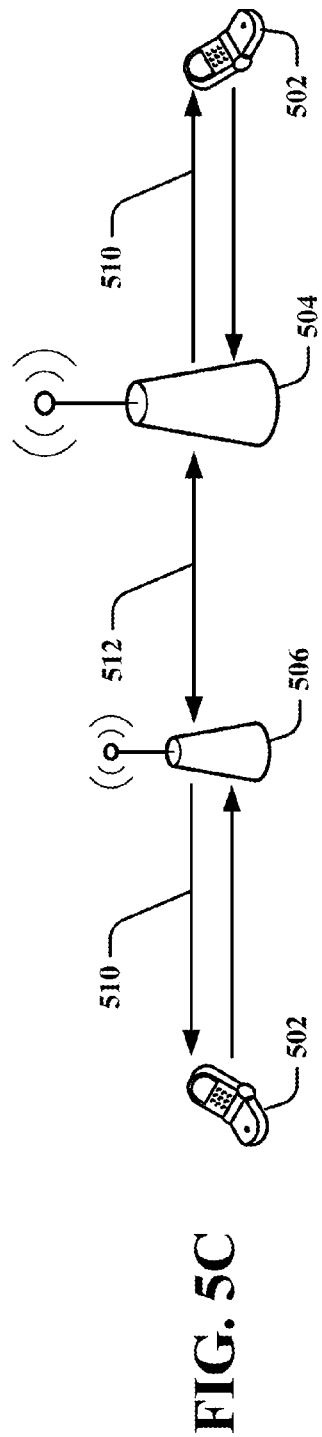
FIG. 5C is still another example access network configuration using unpaired frequencies according to an aspect.

FIGS. 5A, 5B and 5C depict example access network 500 configurations using unpaired frequencies. Access network 500 may include one or more UEs 502, eNodeBs 504 and relay cells 506.

Referring to FIG. 5A, an access network 500 configuration in which multiple UEs 502 may communicate using the unpaired frequency band 410 is depicted. In one aspect, the unpaired frequency band 410 (e.g., 2515-2540 MHz) may be used for UE 502 peer to peer communication 508 in a half duplex mode. Communications between eNodeB and UEs 510 may use FDD UL 402 and FDD DL 404 frequencies while avoiding use of BSS frequencies and corresponding unpaired frequencies 410. Further, UE peer to peer communication 508 may use all of an uplink band including the unpaired frequency band 410 (e.g., 2500-2570 MHz). In one aspect, when a UE terminal transmits with a transmit power greater than a defined threshold, the unpaired frequency band 410 may be used so as to avoid interference with an eNodeB 504 receiver. When a UE 502 transmits with a transmit power smaller than a defined threshold, UE peer to peer communication 508 may use all of an uplink band including the unpaired frequency band 410 (e.g., 2500-2570 MHz). In other words, only band 410 may be used if a UE 502 transmit power is greater than a defined threshold, so as to avoid interference with an eNodeB. In one aspect, the defined threshold may be a parameter based on a transmit power value or estimated interference level according to UE 502 transmit power, path loss values between a UE 502 and eNodeBs 504, a current eNodeB 504 loading/interference level, etc. When UEs are using peer to peer communications, the usage of band may be compatible with other main stream band plans, such as the CEPT/ECC 05(05) band plan. In one aspect, additional signaling messages may be used to enable compatibility. In one such aspect, UE 502 may support flexible duplexing of RF capability in order to enable peer to peer communications 508. In one aspect, a network controller may allocate the unpaired frequency band 410 to the terminal in peer to peer communications 508 when the transmit power is above a defined threshold. In another aspect, the UE peer to peer communications 508 may not affect in-band frequency resource allocations in FDD network 500 and make use of the extra unpaired frequency 410 to provide UE peer to peer communication 508 to increase capacity.

Referring to FIG. 5B, an access network 500 configuration in which a relay cell 506 and a eNodeB 504 may communicate using the unpaired frequency band 410 is depicted. In one aspect, an unpaired frequency band 410 (e.g., 2515-2540 MHz) may be used for relay communications 508 (e.g., network peer to peer communications) in half duplex mode. The relay cell 506 may transmit to the eNodeB 504 in all of an uplink band including the unpaired frequency band 410 (e.g., 2500-2570 MHz). When a relay cell 506 transmits with a transmit power smaller than a defined threshold, relay cell 506 may transmit in all of an uplink band including the unpaired frequency band 410 (e.g., 2500-2570 MHz). In other words, only band 410 may be used if a relay cell transmit power is greater than a defined threshold, so as to avoid interference with an eNodeB. In one aspect, the defined threshold may be a parameter based on a transmit power value or estimated interference level according to relay cell 502 transmit power, path loss values between a relay cell 506 and eNodeBs 504, a current eNodeB 504 loading/interference level, etc. In one aspect, the eNodeB 504 may transmit to the relay cell 506 only in the unpaired frequency band 410 (e.g., 2515-2540 MHz). In one aspect, eNodeB 504 and relay cell 506 may transmit in different time units, e.g., work in half duplex mode for relay communication 508. Contemporaneously, eNodeB 504 and relay cell 506 also communicate on the standard FDD uplink and downlink frequency bands to communicate with one or more UEs 502. As such, relay cell 506 communication may not influence in-band frequency resource of FDD network 500 and make use of the extra unpaired frequency 410 to provide enhanced relay cell 506 to eNodeB 504 communications. In such an aspect, the relay cell 506 may support flexible duplex of RF capability to support enhanced relay cell 506 to eNodeB 504 communications. Further, usage of the unpaired band 410 may provide can be compatibility with other main stream band plans, such as the CEPT/ECC 05(05) band plan.

Referring to FIG. 5C, another access network 500 configuration in which a relay cell 506 and a eNodeB 504 may communicate using the unpaired frequency band 410 is depicted. In one aspect, the unpaired frequency band 410 (e.g., 2515-2540 MHz) may be used for relay cell 506 communications in half duplex mode. In such an aspect, the relay cell 506 may transmit to the eNodeB 504 using all available FDD UL bands 402 include the unpaired frequency band 410, (e.g., 2500-2570 MHz). When a relay cell 506 transmits with a transmit power smaller than a defined threshold, relay cell 506 may transmit in all of an uplink band including the unpaired frequency band 410 (e.g., 2500-2570 MHz). In other words, only band 410 may be used if a relay cell transmit power is greater than a defined threshold, so as to avoid interference with an eNodeB. In one aspect, the defined threshold may be a parameter based on a transmit power value or estimated interference level according to relay cell 502 transmit power, path loss values between a relay cell 506 and eNodeBs 504, a current eNodeB 504 loading/interference level, etc. Further, the eNodeB 504 may transmit 512 to the relay cell 506 using FDD DL frequency bands 404 (e.g., 2630-2635 MHz and 2660-2690 MHz). Further, in one aspect, the relay cell 506 may transmit in different time units to enable communications in a half duplex mode. Contemporaneously, eNodeB 504 and relay cell 506 also communicate on the standard FDD uplink and downlink frequency bands to communicate with one or more UEs 502. In comparison with the aspect depicted in FIG. 5B, no additional filter may be used for the eNodeB 504 to filter out any spurious signals from an eNodeB 504 transmission to UE 502 in band 402. Hence, the aspect depicted in FIG. 5C may use less hardware modifications than the aspect depicted in FIG. 5B. By contrast, the aspect depicted in FIG. 5B may more efficiently use in-band DL frequency resource for more DL capacity than the aspect depicted in FIG. 5C. Additionally. the aspect depicted in FIG. 5C may also be compatible with main stream band plans such as the CEPT/ECC 05(05) band plan and can increase frequency usage efficiency.

Figure 6:
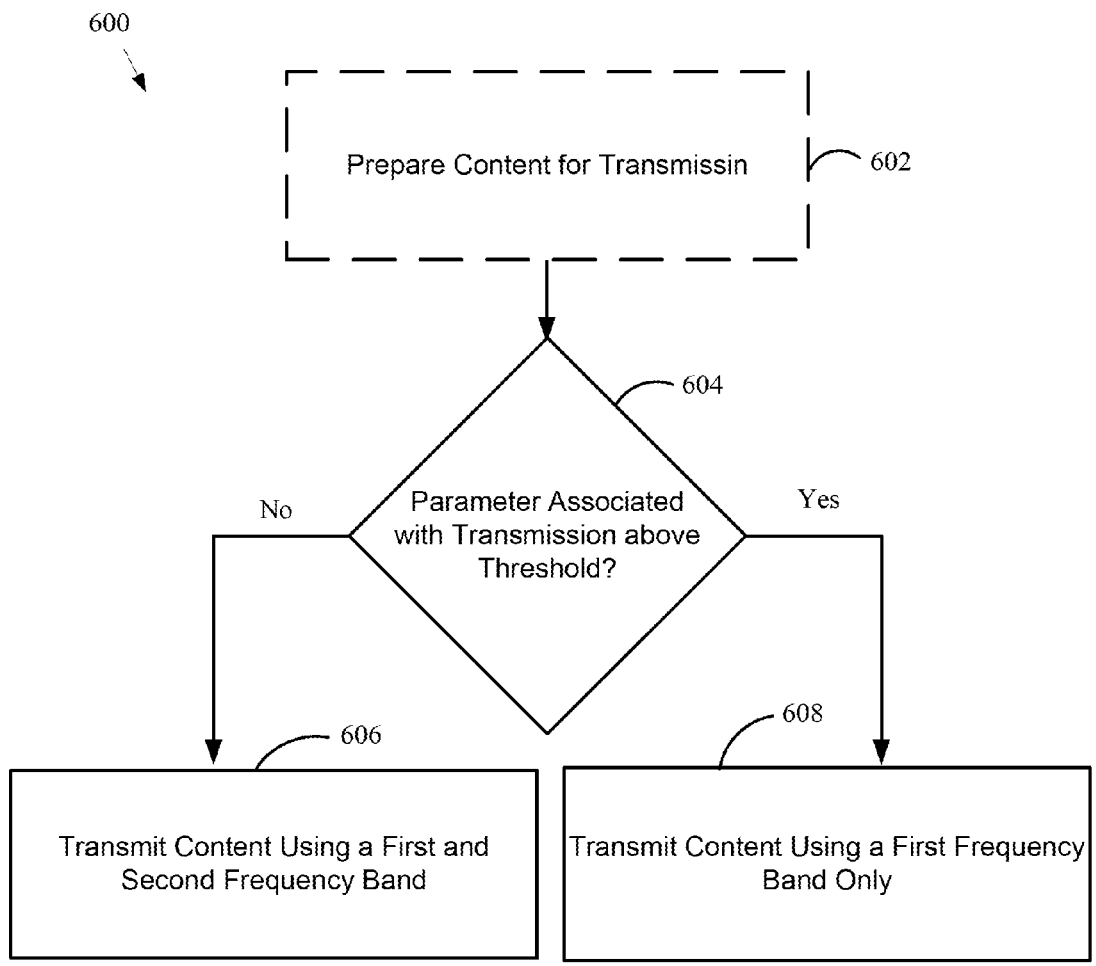
FIG. 6 is a flow chart of a method of wireless communication.

FIG. 6 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 is a flow chart 600 of a method of wireless communication. In one aspect, at reference numeral 602, the method may optionally include preparing content for transmission by a device. In one aspect, the device may be a UE, a relay cell, a nodeB such as an eNodeB, etc. At reference numeral 604, it may be determined if a transmission using a first frequency band to a second device will result in a parameter exceeding a threshold value. In one aspect, the parameter may include at least one of: a transmit power value, or an interference value or level. In one aspect, the first and second devices may be UEs, the transmission may be associated with a peer-to-peer network between the UEs, and the parameter may be a transmit power value or estimated interference level according to UE 502 transmit power, path loss values between a UE 502 and eNodeBs 504, a current eNodeB 504 loading/interference level, etc. In another aspect, the first device may be a relay cell, the second device may be a NodeB, and the parameter may be a relay transmit power value or estimated interference level according to relay cell 502 transmit power, path loss values between a relay cell 506 and eNodeBs 504, a current eNodeB 504 loading/interference level, etc. In one aspect, the second frequency band may be allocated by a network entity, such as a network controller, etc.

If at reference numeral 604, it is determined that the parameter is below the threshold, than at reference numeral 606, the device may transmit content using a first frequency band and a second frequency band, wherein the first and second frequency bands are different. In one aspect, the first frequency band may include an unpaired frequency band in a FDD system. In another aspect, the first frequency band may include 2515 MHz to 2540 MHz, and the second frequency band may include 2500 MHz to 2515 MHz and 2540 MHz to 2570 MHz.

By contrast, if at reference numeral 604, it is determined that the parameter is not below the threshold, than at reference numeral 608 the device may transmit content using a first frequency band upon a determination that the transmission to the second device will result in the parameter exceeding the threshold. In one aspect, the first frequency band may include an unpaired frequency band in a FDD system. In another aspect, the first frequency band may include 2515 MHz to 2540 MHz. Further, in one aspect, response content may be received from the NodeB using the first frequency band when the interference value is above the threshold, and as such interference may be avoided. In another aspect, response content may be transmitted by the NodeB using a third frequency band, such as a FDD DL band.

Figure 7:
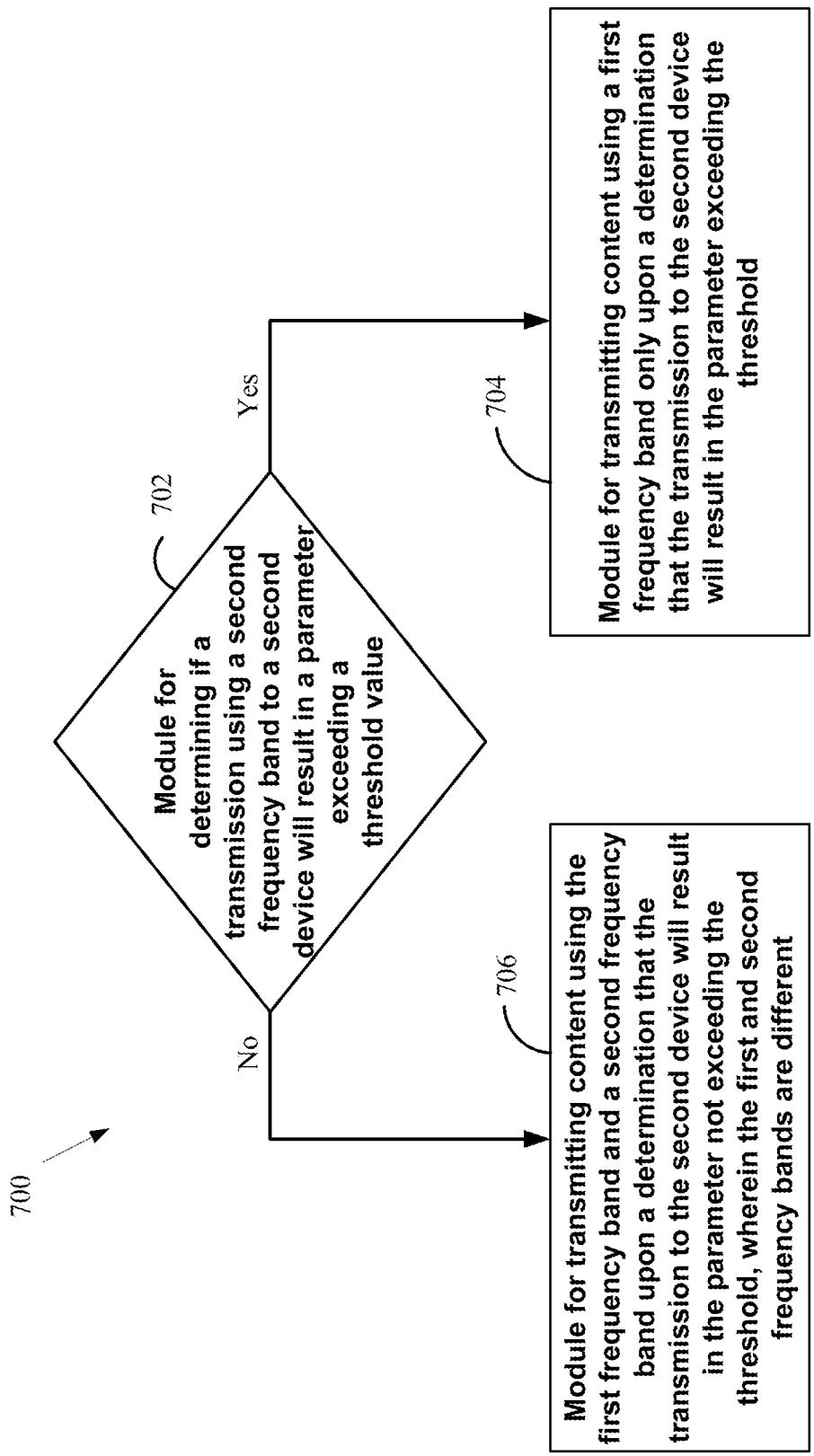
FIG. 7 is a conceptual block diagram illustrating the functionality of an exemplary apparatus.

FIG. 7 is a conceptual block diagram 700 illustrating the functionality of an exemplary apparatus 100. The apparatus 100 includes a module 702 which determines if a transmission using a second frequency band to a second device will result in a parameter exceeding a threshold value, a module 704 that transmits content using a first frequency band upon a determination that the transmission to the second device will result in the parameter exceeding the threshold, and a module 706 that transmits content using the first frequency band and a second frequency band upon a determination that the transmission to the second device will result in the parameter not exceeding the threshold, wherein the first and second frequency bands are different.

Referring to FIG. 1 and FIG. 3, in one configuration, the apparatus 100 for wireless communication includes means for determining, by a first device, if a transmission using a second frequency band to a second device will result in a parameter exceeding a threshold value, and means for transmitting content using a first frequency band upon a determination that the transmission to the second device will result in the parameter exceeding the threshold, or means for transmitting content using the first frequency band and a second frequency band upon a determination that the transmission to the second device will result in the parameter not exceeding the threshold, wherein the first and second frequency bands are different. In another configuration, the apparatus 100 includes means for receiving content from the NodeB using the first frequency band when the interference value is above the threshold. In another configuration, the apparatus 100 includes means for transmitting as part of a half duplex communications process. The aforementioned means is the processing system 114 configured to perform the functions recited by the aforementioned means. As described supra, the processing system 114 includes the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications, comprising:
   performing, by a first device, communications with a second device using a set of frequency bands comprising at least one uplink frequency band and at least one downlink frequency band;
   determining by the first device, whether transmissions from the first device to a third device will result in a parameter exceeding a threshold value;
   transmitting by the first device to the third device, content using an unpaired frequency band of the set of frequency bands upon a determination that transmissions to the third device will result in the parameter exceeding the threshold; and
   transmitting by the first device to the third device, content using the at least one uplink frequency band and the unpaired frequency band of the set of frequency bands upon a determination that transmissions to the third device will result in the parameter not exceeding the threshold.

2. The method of claim 1, wherein the parameter includes at least one of: a transmit power value, or an interference value.

3. The method of claim 1, wherein the first and third devices comprise user equipments (UEs), wherein the transmission by the first device to the third device is associated with a peer-to-peer network between the first and third devices, and wherein the parameter comprises at least one of: a transmit power value, an estimated interference level from the transmit power value, path loss values between a UE and one or more NodeBs, or a NodeB loading/interference level.

4. The method of claim 1, wherein the first device comprises a relay node, wherein the third device comprises a NodeB, and wherein the parameter comprises at least one of: a transmit power value, an estimated interference level from the transmit power value, path loss values between the relay node and one or more NodeBs, or a NodeB loading/interference level.

5. The method of claim 4, further comprising:
   receiving content from the NodeB using the unpaired frequency band of the set of frequency bands when the estimated interference level is exceeds the threshold.

6. The method of claim 1, wherein the unpaired frequency band of the set of frequency bands is allocated by a network entity.

7. The method of claim 1, wherein the transmission by the first device to the third device using the unpaired frequency band of the set of frequency bands further comprises transmitting as part of a half duplex communications process.

8. The method of claim 1, wherein the first and second devices are operable to communicate in a Frequency Division Duplexing (FDD) system.

9. The method of claim 1, wherein the unpaired frequency band of the set of frequency bands comprises 2515 MHz to 2540 MHz, and the at least one uplink frequency band comprises 2500 MHz to 2515 MHz and 2540 MHz to 2570 MHz.

10. An apparatus, comprising:
    means for performing, by a first device, communications with a second device using a set of frequency bands comprising at least one uplink frequency band and at least one downlink frequency band;
    means for determining by the first device, whether transmissions from the first device to a third device will result in a parameter exceeding a threshold value;
    means for transmitting by the first device to the third device, content using an unpaired frequency band of the set of frequency bands upon a determination that transmissions to the third device will result in the parameter exceeding the threshold; and
    means for transmitting by the first device to the third device, content using the at least one uplink frequency band and the unpaired frequency band of the set of frequency bands upon a determination that transmissions to the third device will result in the parameter not exceeding the threshold.

11. The apparatus of claim 10, wherein the parameter includes at least one of: a transmit power value, or an interference value.

12. The apparatus of claim 10, wherein the first and third devices comprise user equipments (UEs), wherein the transmission by the first device to the third device is associated with a peer-to-peer network between the first and third devices, and wherein the parameter comprises at least one of: a transmit power value, an estimated interference level from the transmit power value, path loss values between a UE and one or more NodeBs, or a NodeB loading/interference level.

13. The apparatus of claim 10, wherein the first device comprises a relay node, wherein the third device comprises a NodeB, and wherein the parameter comprises at least one of: a transmit power value, an estimated interference level from the transmit power value, path loss values between the relay node and one or more NodeBs, or a NodeB loading/interference level.

14. The apparatus of claim 13, further comprising:
means for receiving content from the NodeB using the unpaired frequency band of the set of frequency bands when the estimated interference level is exceeds the threshold.

15. The apparatus of claim 10, wherein the unpaired frequency band of the set of frequency bands is allocated by a network entity.

16. The apparatus of claim 10, wherein the transmission by the first device to the third device using the unpaired frequency band of the set of frequency bands further comprises transmitting as part of a half duplex communications process.

17. The apparatus of claim 10, wherein the first and second devices are operable to communicate in a Frequency Division Duplexing (FDD) system.

18. The apparatus of claim 10, wherein the unpaired frequency band of the set of frequency bands comprises 2515 MHz to 2540 MHz, and the at least one uplink frequency band comprises 2500 MHz to 2515 MHz and 2540 MHz to 2570 MHz.

19. A computer program product, comprising:
a non-transitory computer-readable medium comprising code for:
performing, by a first device, communications with a second device using a set of frequency bands comprising at least one uplink frequency band and at least one downlink frequency band;
determining by the first device, whether transmissions from the first device to a third device will result in a parameter exceeding a threshold value;
transmitting by the first device to the third device, content using an unpaired frequency band of the set of frequency bands upon a determination that transmissions to the third device will result in the parameter exceeding the threshold; and
transmitting by the first device to the third device, content using the at least one uplink frequency band and the unpaired frequency band of the set of frequency bands upon a determination that transmissions to the third device will result in the parameter not exceeding the threshold.

20. The computer program product of claim 19, wherein the parameter includes at least one of: a transmit power value, or an interference value.

21. The computer program product of claim 19, wherein the first and third devices comprise user equipments (UEs), wherein the transmission by the first device to the third device is associated with a peer-to-peer network between the first and third devices, and wherein the parameter comprises at least one of: a transmit power value, an estimated interference level from the transmit power value, path loss values between a UE and one or more NodeBs, or a NodeB loading/interference level.

22. The computer program product of claim 19, wherein the first device comprises a relay node, wherein the third device comprises a NodeB, and wherein the parameter comprises at least one of: a transmit power value, an estimated interference level from the transmit power value, path loss values between the relay node and one or more NodeBs, or a NodeB loading/interference level.

23. The computer program product of claim 22, wherein the computer-readable medium further comprises code for:
receiving content from the NodeB using the unpaired frequency band of the set of frequency bands when the estimated interference level is exceeds the threshold.

24. The computer program product of claim 19, wherein the unpaired frequency band of the set of frequency bands is allocated by a network entity.

25. The computer program product of claim 19, wherein the code for transmitting by the first device to the third device, content using the unpaired frequency band of the set of frequency bands further comprises code for transmitting as part of a half duplex communications process.

26. The computer program product of claim 19, wherein the first and second devices are operable to communicate in a Frequency Division Duplexing (FDD) system.

27. The computer program product of claim 19, wherein the unpaired frequency band of the set of frequency bands comprises 2515 MHz to 2540 MHz, and the at least one uplink frequency band comprises 2500 MHz to 2515 MHz and 2540 MHz to 2570 MHz.

28. An apparatus for wireless communication, comprising:
a processing system configured to:
perform, by a first device, communications with a second device using a set of frequency bands comprising at least one uplink frequency band and at least one downlink frequency band;
determine by the first device, whether transmissions from the first device to a third device will result in a parameter exceeding a threshold value;
transmit by the first device to the third device, content using an unpaired frequency band of the set of frequency bands upon a determination that transmissions to the third device will result in the parameter exceeding the threshold; and
transmit by the first device to the third device, content using the at least one uplink frequency band and the unpaired frequency band of the set of frequency bands upon a determination that transmissions to the third device will result in the parameter not exceeding the threshold.

29. The apparatus of claim 28, wherein the parameter includes at least one of: a transmit power value, or an interference value.

30. The apparatus of claim 28, wherein the first and third devices comprise user equipments (UEs), wherein the transmission by the first device to the third device is associated with a peer-to-peer network between the first and third devices, and wherein the parameter comprises at least one of: a transmit power value, an estimated interference level from the transmit power value, path loss values between a UE and one or more NodeBs, or a NodeB loading/interference level.

31. The apparatus of claim 28, wherein the first device comprises a relay node, wherein the third device comprises a NodeB, and wherein the parameter comprises at least one of: a transmit power value, an estimated interference level from the transmit power value, path loss values between the relay node and one or more NodeBs, or a NodeB loading/interference level.

32. The apparatus of claim 31, wherein the processing system is further configured to:
receive content from the NodeB using the unpaired frequency band of the set of frequency bands when the estimated interference level is exceeds the threshold.

33. The apparatus of claim 28, wherein the unpaired frequency band of the set of frequency bands is allocated by a network entity.

34. The apparatus of claim 28, wherein the processing system configured to transmit by the first device to the third device, content using the unpaired frequency band of the set of frequency bands is further configured to transmit as part of a half duplex communications process.

35. The apparatus of claim 28, wherein the first and second devices are operable to communicate in a Frequency Division Duplexing (FDD) system.

36. The apparatus of claim 28, wherein the unpaired frequency band of the set of frequency bands comprises 2515 MHz to 2540 MHz, and the at least one uplink frequency band comprises 2500 MHz to 2515 MHz and 2540 MHz to 2570 MHz.

* * * * *